US007580368B2

(12) United States Patent
Yoneda et al.

(10) Patent No.: US 7,580,368 B2
(45) Date of Patent: Aug. 25, 2009

(54) PACKET DISTRIBUTION CONTROL METHOD

(75) Inventors: Takahiro Yoneda, Tokyo (JP); Eiichi Muramoto, Kanagawa (JP); Fumiaki Suzuki, Kyoto (JP)

(73) Assignee: Panasonic Corporation, Osaka (JP)

( * ) Notice: Subject to any disclaimer, the term of this patent is extended or adjusted under 35 U.S.C. 154(b) by 459 days.

(21) Appl. No.: 10/576,361

(22) PCT Filed: Oct. 20, 2004

(86) PCT No.: PCT/JP2004/015516

§ 371 (c)(1),
(2), (4) Date: Apr. 19, 2006

(87) PCT Pub. No.: WO2005/041498

PCT Pub. Date: May 6, 2005

(65) Prior Publication Data

US 2007/0076703 A1 Apr. 5, 2007

(30) Foreign Application Priority Data

Oct. 22, 2003 (JP) ............................. 2003-361524
Oct. 14, 2004 (JP) ............................. 2004-300604

(51) Int. Cl.
*H04L 12/28* (2006.01)

(52) U.S. Cl. ..................... 370/254; 370/312; 370/390; 370/432

(58) Field of Classification Search ................. 370/390, 370/432
See application file for complete search history.

(56) References Cited

U.S. PATENT DOCUMENTS 5,331,637 A * 7/1994 Francis et al. ............... 370/408

(Continued)

FOREIGN PATENT DOCUMENTS

JP          10-336176          12/1998

(Continued)

OTHER PUBLICATIONS

Im et al. "Multicast Routing Algorithms in High Speed Networks." IEEE Xplore. 1995.*

(Continued)

*Primary Examiner*—Ayaz R Sheikh
*Assistant Examiner*—Peter Chau
(74) *Attorney, Agent, or Firm*—Greenblum & Bernstein, P.L.C.

(57) ABSTRACT

A packet distribution control method in the case of performing multicast communication in network environment where both networks that support IP multicast and that do not support IP multicast exist. In packet distribution in multicast communication, each end node checks mutually whether or not other end nodes are capable of communicating in IP multicast. Then, each end node uses IP unicast in packet distribution to other end nodes not capable of communicating only in IP multicast.

10 Claims, 7 Drawing Sheets

U.S. PATENT DOCUMENTS

| | | | | |
|---|---|---|---|---|
| 5,361,256 | A * | 11/1994 | Doeringer et al. | 370/390 |
| 5,517,494 | A * | 5/1996 | Green | 370/408 |
| 5,831,975 | A * | 11/1998 | Chen et al. | 370/256 |
| 5,903,559 | A * | 5/1999 | Acharya et al. | 370/355 |
| 6,088,333 | A * | 7/2000 | Yang et al. | 370/238 |
| 6,252,856 | B1 * | 6/2001 | Zhang | 370/254 |
| 6,717,921 | B1 * | 4/2004 | Aggarwal et al. | 370/256 |
| 6,778,531 | B1 * | 8/2004 | Kodialam et al. | 370/390 |
| 6,836,481 | B1 | 12/2004 | Hotta | |
| 2002/0191612 | A1 | 12/2002 | Curtis | |
| 2003/0012216 | A1 * | 1/2003 | Novaes | 370/432 |
| 2004/0252691 | A1 * | 12/2004 | Hori et al. | 370/390 |
| 2005/0100016 | A1 * | 5/2005 | Miller et al. | 370/390 |
| 2005/0141507 | A1 | 6/2005 | Curtis | |

FOREIGN PATENT DOCUMENTS

| | | |
|---|---|---|
| JP | 2001-230774 A | 8/2001 |
| JP | 2002-118552 | 4/2002 |
| JP | 2002-185528 | 6/2002 |
| JP | 2003-188918 | 7/2003 |
| JP | 2004-104175 | 4/2004 |
| JP | 2004-153312 | 5/2004 |

OTHER PUBLICATIONS

English Language Abstract of JP 2003-188918.
English Language Abstract of JP 2002-118552.
English Language Abstract of JP 10-336176.
English Language Abstract of JP 2002-185528.
English Language Abstract of JP 2004-104175.
English Language Abstract of JP 2004-153312.
English language Abstract of JP 2001-230774 A, 08/24/01.

* cited by examiner

| | NODE NAME OF END NODE TO WHICH STATE INFORMATION BELONGS | | | | |
|---|---|---|---|---|---|
| | IP ADDRESS OF END NODE TO WHICH STATE INFORMATION BELONGS | | | | |
| LIST OF INTERNAL END NODE TO WHICH STATE INFORMATION BELONGS | NODE NAME | IP ADDRESS | THE NUMBER OF HOPS | DELAY | USABLE BANDWIDTH |
| | ............................................................................... | | | | |
| | | | | | |
| LIST OF EXTERNAL END NODE TO WHICH STATE INFORMATION BELONGS | | | | | |
| | ............................................................................... | | | | |

FIG. 2

| IP ADDRESS OF END NODE AS A ROOT OF DISTRIBUTION TREE (ORIGINAL SENDER) | LIST OF IP ADDRESS OR IP MULTICAST ADDRESS OF END NODE AS A FORWARDING DESTINATION OF PACKET |
|---|---|
| | |
| | |

FIG. 5

PACKET DISTRIBUTION CONTROL METHOD

TECHNICAL FIELD

The present invention relates to a packet distribution control method in one-to-many communication where a plurality of receivers exist for a single sender, or to a packet distribution control method in many-to-many communication where a plurality of receivers exist for a plurality of senders.

BACKGROUND ART

There is IP multicast as packet distribution method used in one-to-many communication or many-to-many communication (hereinafter, referred to as "multicast communication") performed on the Internet. IP multicast refers to a method of performing packet replication, forwarding processing thereof, member management processing, and multicast distribution tree construction processing in relay apparatus (hereinafter, referred to as "routers") spread over the Internet.

In IP multicast, in distribution of packets from one or a plurality of senders to one or a plurality of receivers (hereinafter, a set of senders and receivers in multicast communication will be referred to as an "end node"), a router performs packet replication and packet forwarding processing as appropriate. It is thereby possible to save network resources consumed in packet distribution and enable efficient packet distribution.

However, it is indispensable that the router supports IP multicast. Therefore, there is a low possibility that all routers on the Internet support IP multicast and the environment is soon realized that IP multicast can be used on the entire Internet. For the present, it is expected that the Internet includes both networks that support IP multicast and do not support IP multicast.

In the case of performing multicast communication using IP multicast, all end nodes must connect to a network that supports IP multicast. Further, in IP multicast, routers on a path need to accurately process Join/Leave packets in IGMP (Internet Group Management Protocol) of a receiver, and exchange control messages (by routing protocol for IP multicast) between the routers to forward an IP multicast packet accurately to a receiver, and therefore communication is impossible via a router and network that do not support IP multicast, thereby restricting the use of multicast communication of users.

There is application layer multicast, as a packet distribution method to solve the above problem of IP multicast in multicast communication. IP multicast refers to a method implemented primarily on the router, while application layer multicast is a general term for methods implemented on end nodes.

Application layer multicast refers to a method that when one or a plurality of senders performs packet distribution to one or a plurality of receivers, an end node calculates and constructs a multicast distribution tree with other end nodes as branches, and a packet is transmitted, replicated, and forwarded using IP unicast according to the distribution tree. In application layer multicast, since routers are only required to forward IP unicast packets, the current Internet infrastructure can be used without change, and users are not limited in use of multicast communication.

However, since all functions required for multicast communication are concentrated on end nodes including packet replication and forwarding processing thereof, member management processing, and multicast distribution tree construction processing, there is a problem that the processing load on end nodes increases. Further, all packets distribution is performed by IP unicast, and another problem arises of increasing the network resources consumed in packet distribution. From these reasons, application layer multicast is not suitable particularly for multicast communication having a plurality of senders and receivers.

Thus, the problem remains that the processing load on the end node increases in application layer multicast. On the other hand, there is a system where application layer multicast dedicated hardware on a router performs packet replication and packet forwarding processing as a substitute for the end node to reduce the processing load on the end node (for example, refer to Patent Document 1).

However, the above system needs to prepare special routers provided with hardware that supports the system, and is low in possibility of being spread over the Internet. Accordingly, the convenience is not high for users that perform multicast communication.

Patent Document 1: Unexamined Japanese Patent Publication No. 2003-188918

DISCLOSURE OF INVENTION

Problems to be Solved by the Invention

It is therefore an object of the present invention to provide a packet distribution control method for reducing processing load on end nodes, enabling the use of communication that supports IP multicast, and saving network resources consumed in packet distribution in network environment where both networks that support IP multicast and that do not support IP multicast exist.

Means for Solving the Problem

In order to solve the above problems, the packet distribution control method of the present invention uses both IP multicast and IP unicast in packet distribution performed on end nodes in multicast communication, and switches between IP multicast and IP unicast according to an end node that is a receiver.

In other words, in packet distribution in multicast communication, end nodes check mutually whether or not other end nodes are capable of communicating in IP multicast. Then, end nodes use IP unicast in packet distribution to other end nodes not capable of communicating using only IP multicast. Multicast communication is thereby implemented on a network that does not support IP multicast that is the issue of IP multicast, and the problem thus is solved such that users are restricted in use of multicast communication by the existence of the network that does not support IP multicast.

Further, when a plurality of end nodes are connected to the same IP multicast network and communication using IP multicast can be performed, IP multicast is used for packet distribution between the end nodes, and a router on the network that supports IP multicast executes processing of packet replication and forwarding processing thereof, and part of processing of multicast distribution tree construction required for multicast communication. By this means, the processing load on end nodes is reduced compared to the case of application layer multicast, and saving of used network resources is implemented.

Advantageous Effect of the Invention

According to the present invention, it is possible to provide a packet distribution control method for implementing multicast communication with reduced consumption of network resources and without increased processing load on end nodes in network environment where both networks that support IP multicast and that do not support IP multicast exist.

BRIEF DESCRIPTION OF DRAWINGS

FIG. 2 is a conceptual diagram illustrating a recording format of state information in the end nodes;

FIG. 5 is a conceptual diagram illustrating a forwarding rule recording format in the end nodes;

BEST MODE FOR CARRYING OUT THE INVENTION

Figure 1:
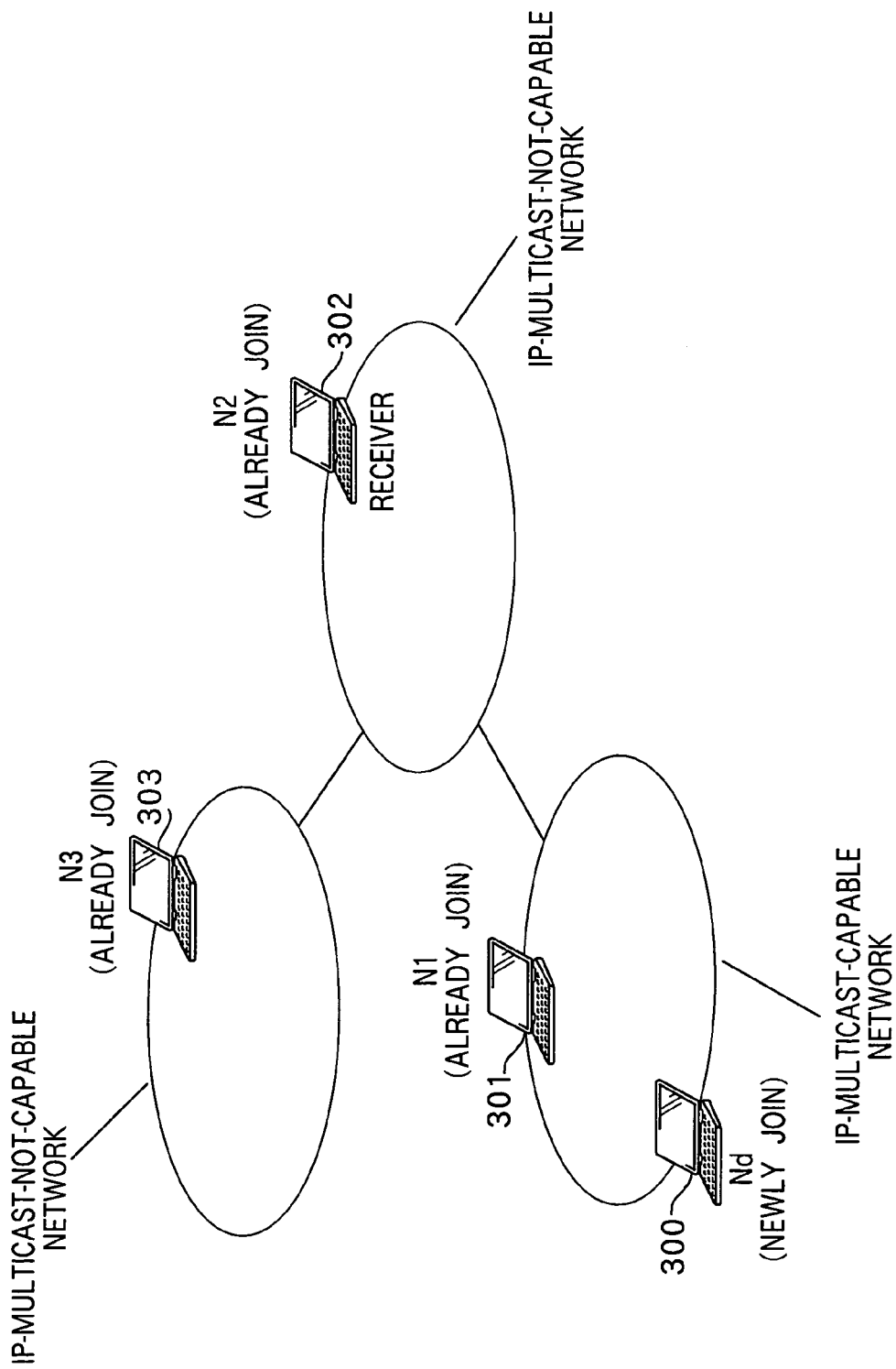
FIG. 1 is a diagram illustrating a positional relationship between end nodes.

Embodiments of the present invention will be described in detail below with reference to the accompanying drawings.

A brief description of a packet distribution control method according to this embodiment will be first explained. The packet distribution control method of this Embodiment includes following steps.

Step 1: Each end node joining multicast communication acquires IP address information of other end nodes than itself.

Step 2: In performing packet distribution in the multicast communication, each end node checks mutually whether other end nodes are capable of communicating in IP multicast, or capable of communicating only in IP unicast.

Step 3: Each end node exchanges mutually the result obtained in step 2, and calculates and constructs a multicast distribution tree required for the multicast communication.

Step 4: From the results of steps 1 to 3, in a certain end node, when other end node is present which is capable of communicating in IP multicast, packet distribution is performed using IP multicast between these end nodes, while other end node is present which is not capable of communicating in IP multicast, packet distribution is performed using IP unicast between these end nodes.

Packet distribution is thus implemented that solves both problems of IP multicast and application layer multicast in multicast communication.

Processing procedures in each step will be described below in detail. In addition, in descriptions of processing procedures in each step below, SSM (Source Specific Multicast) is assumed as a premised IP multicast method. ASM (Any Source Multicast) that is another IP multicast method identifies a multicast group by an IP multicast address (G). SSM identifies a multicast group by a pair of an IP address (S) and IP multicast address (G) of a sender. A receiver to receive packets distributed using SSM transmits a join packet by IGMP of (S, G) to a router. The router receiving the join packet constructs a multicast distribution tree for each (S, G) between routers, and performs packet replication and forwarding according to the distribution tree. Since SSM identifies the multicast group by a pair of (S, G), SSM does not require IP multicast address assignment which ASM requires to identify uniquely on the Internet.

In addition, a mechanism for IP multicast address assignment is provided on each network that supports IP multicast and that end nodes connect to, and it is thereby possible to use ASM in the present invention.

[Step 1]

In step 1, in order that each end node joining multicast communication can acquire IP address information of other end nodes, a method of using a server (hereinafter, referred to as a "member management server") that manages joining and leaving multicast communication of end nodes, and a method where each end node joining multicast communication has the function of exchanging messages with one another and thereby managing itself independently and dispersely (hereinafter, referred to as a "dispersed member management function"), are assumed. Processing procedures in above two methods will be described below. In addition, the processing procedures described below are performed whenever an end node joins or leaves the multicast communication.

The method of using the member management server will be first described. First, when a certain end node (Na) joins or leaves multicast communication, Na transmits a message aimed to request join or leave (hereinafter, respectively referred to as a "join request message" and "leave request message") to the member management server. When Na transmits the join request message to the member management server, Na acquires IP addresses of other end nodes already joining multicast communication from the member management server.

Meanwhile, the other end nodes already joining multicast communication receive a message aimed to advertise join or leave (hereinafter, respectively referred to as a "join advertising message" and "leave advertising message") of end node (Na) from the member management server. Then, the end nodes recognize the IP address information and join or leave of Na.

Next, the method of using the dispersed member management function will be described. First, when a certain end node (Nb) joins or leaves multicast communication, Nb transmits a join request message or leave request message including IP address information of Nb to one end node (Nc) of other end nodes already joining multicast communication. Further, when Nb transmits the join request message to Nc, Nb acquires IP addresses of the other end nodes already joining multicast communication from Nc.

Meanwhile, Nc reports Nb joining or leaving multicast communication to each of other end nodes already joining multicast communication by transmitting the join advertising message or leave advertising message. Each of other end nodes than Nc already joining multicast communication receives the join advertising message or leave advertising message, and thereby, recognizing the IP address information and join or leave of Nb.

[Step 2]

In step 2, each end node performs processing described below to mutually judge whether communication in IP multicast is possible, or communication is possible only in IP unicast. In addition, following processing procedures are performed whenever a new end node joins multicast communication. It is assumed in the following processing procedures that Nd300 is an end node that newly joins multicast communication, Sd is an IP address of Nd300, Gd is an IP multicast address used by Nd, Ni (301 to 303) is each end node already joining multicast communication, Si is an IP address of Ni, and that Gi is an IP multicast address used by Ni. "i" is a variable and ranges from 1 to 3. FIG. 1 shows the positional relationship between the end nodes.

First, when Nd joins multicast communication, Nd transmits to the router join packets to a plurality of multicast groups with Ni indicated by (Si, Gi) as a source based on IP addresses of other end nodes already joining multicast communication acquired from the processing described in step 1. Meanwhile, when Ni recognizes joining in multicast communication and IP address of Nd in the processing procedures described in step 1, Ni transmits to the router a join packet to the multicast groups with Nd indicated by (Sd, Gd) as a source. The router receiving the join packets constructs a multicast distribution tree for each multicast group between routers, and performs packet replication and forwarding according to this distribution tree.

Next, Nd transmits a message aimed to obtain a response (hereinafter, referred to as a "response request message") to the multicast group with Nd as a source i.e. as an IP multicast packet with (Gd) as a destination. Ni transmits a response request message to the multicast group with Ni as a source i.e. as an IP multicast packet with (Gi) as a destination.

Each end node receiving the response request message transmits a message aimed to reply in response to the response request message (hereinafter, referred to as a "response message") as an IP unicast packet with the IP address of the source end node of the response request message as a destination.

An end node which is capable of receiving the response request message using IP multicast is capable of communicating in IP multicast from the source end node of the response request message. Accordingly, the source end node of the response request message receiving the response packet can judge that communication in IP multicast is possible with the source end node of the response message. On the other hand, the source end node of the response request message can judge that communication in IP multicast communication is not possible with an end node that does not return a response message to response request message (i.e. only communication in IP unicast is possible).

For example, in the network configuration shown in FIG. 1, only N1(301) is capable of receiving a response request message transmitted (as an IP multicast packet with Gd as a destination) from a newly joining Nd(300), and upon receiving the response request message, transmits a response message (as an IP unicast packet with Sd as a destination) in response to the response request message. Upon receiving the response message transmitted from N1(301), Nd(300) judges that communication in IP multicast is possible with N1(301), and further, judges that communication in IP multicast is not possible with N2(302) and N3(303) which do not respond to the response request message. Next, only Nd(300) is capable of receiving a response request message transmitted (as an IP multicast packet with G1 as a destination) from N1(301), and upon receiving the response request message, transmits a response message (as an IP unicast packet with S1 as a destination) in response to the response request message. Upon receiving the response message transmitted from Nd(300), N1(301) judges that communication in IP multicast is possible with Nd(300), and further, judges that communication in IP multicast is not possible with N2(302) and N3(303) which do not respond to the response request message. Finally, no end node can receive a response request message (as an IP multicast packet with G2 or G3 as a destination) respectively from each of N2(302) and N3(303), nor return a response message in response to the response request message. Therefore, N2(302) judges that communication in IP multicast is not possible with Nd(300), N1(301) and N3(303), while N3(303) judges that communication in IP multicast is not possible with Nd(300), N1(301) and N2(302).

According to the above-mentioned processing procedures, Nd distinguishes between end nodes capable of communicating in IP multicast and end nodes capable of communicating only in IP unicast. Further, Ni identifies Nd as an end node capable of communicating in IP multicast or end node capable of communicating only in IP unicast. Thereafter, with respect to a certain end node, a set of end nodes capable of communicating in IP multicast will be described as an internal end node, while a set of end nodes capable of communicating only in IP unicast is described as an external end node.

In addition, during the processing described in step 2 where Nd and Ni judge whether communication in IP multicast is possible with Ni or Nd, Nd and Ni cannot communicate with each other. Therefore, Nd regards all Ni as the external end nodes, while Ni regards Nd as the external end node, and Nd and Ni perform processing described in step 3 below. By this means, for the problem that communication between Nd and Ni is suspended during the processing described in step 2, Ni and Nd can perform packet distribution in IP unicast respectively to Nd and Ni.

In addition, each end node transmits a response request packet at regular intervals, and it is thus possible to reduce the error in judgment on internal end node or external end node for a loss of the response request packet.

Further, each end node inserts an IP address of an end node of a source of the response message already received in the each end node to a packet of the response request message transmitted from some end node for a fixed period. Meanwhile, an end node receiving a response request message does not transmit a response message when the response request message includes an IP address of itself. By this means, message exchange amounts and processing load on end nodes imposed by control packet exchange are reduced.

In addition, as a method of determining an IP multicast address used by each end node, such a method is assumed that a network operator assigns a common IP multicast address. Further, another method is assumed that text information for a person identifying multicast communication (hereinafter, referred to as a "multicast communication identifier") is transformed into numbers such as binary numbers to add the numbers to a basic IP multicast address, thereby calculating a common IP multicast address. Still furthermore, another method is assumed that each end node arbitrarily determines an IP multicast address to use, and the member management server or the dispersed member management function in step 1 advertises the IP multicast address used by each end node.

In addition, in the case of using ASM in the IP multicast system, each end node substitutes a join packet with IP multicast address (G) assigned by the IP multicast address assigning mechanism on each network that supports IP multicast for the join packet of (S, G) used in the case of SSM.

[Step 3]

Step 3 is a step for calculating and constructing a multicast distribution tree required for multicast communication, and includes a step of recognizing state information of each end node (hereinafter referred to as "step3-1"), a step of calculating a multicast distribution tree (hereinafter referred to as "step3-2") and a step of constructing the multicast distribution tree (hereinafter referred to as "step 3-3").

Herein, the state information of end node (Ne) includes information of delay, the number of hops and usable bandwidth on a path in packet forwarding between Ne and other end nodes, and information of lists of the internal end node and external end node with respect to Ne described in step 2. FIG. 2 shows an example of a configuration of state information. In addition, contents of information constituting the state information enable addition, change and deletion as appropriate.

(Step 3-1)

In step 3-1, following processing is performed for each end node to recognize state information of one another. The following processing procedures are performed whenever an end node joins multicast communication.

First, when a certain end node (Nf) joins the multicast communication, Nf performs the processing described in the steps 1 and 2. Then, with respect to the external end node of Nf, the number of hops, delay, and usable bandwidth on the path in packet forwarding between Nf and external end node of Nf are measured. Further, end nodes already joining multicast communication perform the processing described in the steps 1 and 2. Then, only when Nf is judged as the external end node of itself, the number of hops, delay and usable bandwidth on the path in packet forwarding between itself and Nf are measured.

Next, Nf sends a state information advertising message aimed to advertise the newly generated state information of Nf to other end nodes using IP unicast. Further, the end nodes that update the state information of themselves by the measurement processing transmit the state information advertising message to other end nodes using IP unicast.

In addition, only an end node that is a sender needs the state information of other end nodes. Further, the distribution tree construction between internal end nodes for the end node that is a sender is processed on the router that supports IP multicast, and therefore, the end node that is a sender does not need the state information of the internal end node. Thus, transmission of the state information advertising message are targeted to the end node that is the external end node for the source end node of the message and that is a sender, and it is thereby possible to reduce amounts of advertisement of the state information advertising information.

In addition, Nf transmits the state information advertising message of Nf to the member management server in step 1, advertises the information advertising message to other end nodes requiring the information advertising message via the member management server, and it is thereby possible to reduce the amount of advertisement of the state information advertising information.

In the above processing procedures, each end node recognizes the state information of other end nodes.

(Step 3-2)

The multicast distribution tree in the present invention is a one-to-many distribution tree with a sender as a root. Further, an end node as the sender calculates the multicast distribution tree. Processing procedures required for calculating the multicast distribution tree will be described below. The following processing procedures are performed, whenever an end node (Ng) joins multicast communication, in Ng (end node) when Ng is a sender, or in an end node where the processing described in the step 1 and step 2 has been performed, and judging Ng as the external end node, and already joining multicast communication, and that is a sender. Further, the following processing procedures are performed, whenever Ng leaves multicast communication, in an end node already joining multicast communication, judging Ng as the external end node and that is a sender.

In addition, with respect to joining and leaving of Ng, the need of calculation and construction processing of the multicast distribution tree is not required in an end node already joining multicast communication, judging Ng as the internal end node and that is a sender.

There are SPT (Shortest Path Tree) to obtain a shortest-path tree, MST (Minimum Spanning Tree) to obtain a minimum-spanning tree, and an algorithm to meet required QoS (Quality of Service) among algorithms to calculate a multicast distribution tree. It is assumed in the present invention that a calculation algorithm is selected according to a request from upper application.

Figure 3:
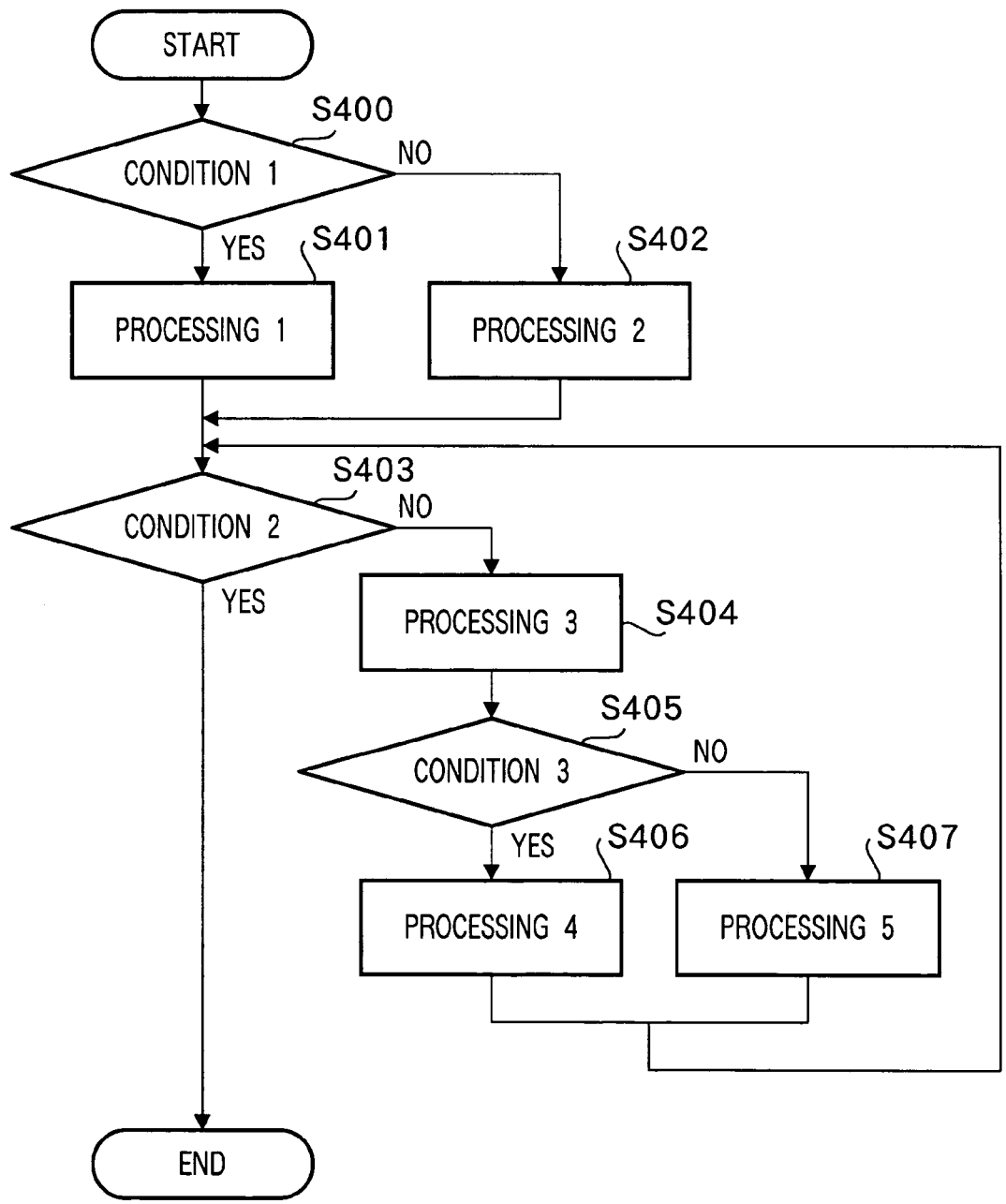
FIG. 3 is a flowchart to calculate a multicast distribution tree.

FIG. 3 is a flowchart to calculate a multicast distribution tree. Referring to FIG. 3, a method of calculating the multicast distribution tree, assuming that Nh is an end node that is a sender in multicast communication, SPT is multicast calculation algorithm, and that the number of hops between end nodes is metrics with respect to the multicast calculation algorithm, will be described below.

Condition 1 (400): Processing 1 (S401) is executed when the internal end node of Nh is present, while processing 2 (S402) is executed when the internal end node of Nh is not present.

Processing 1 (S401): No end node is described in a branch candidate target list (list of end nodes already included in a distribution tree during the process of calculating the distribution tree), and end nodes other than Nh and the internal end node of Nh are described in a calculation target list (a list of end nodes not included in the distribution tree during the process of calculating the distribution tree). In the network configuration shown in FIG. 4, receivers 101 and 102 are internal end nodes of sender 100, and other receivers (103 to 107) are described in the calculation target list.

Processing 2 (S402): No end node is described in the branch candidate target list, and end nodes other than Nh are described in the calculation target list.

Condition 2 (S403): When an end node that is a receiver is not described in the calculation target list, the processing is finished of calculating the multicast distribution tree. When an end node that is a receiver is described in the calculation target list, processing 3 (S404) is executed.

Processing 3 (S404): According to SPT that is the algorithm of calculating a multicast distribution tree, an end node that minimizes the sum of the number of hops that is metrics is selected from among the end nodes described in the calculation target list, via Nh or the end node described in the branch candidate list, and the end node is set to be a branch of the multicast distribution tree. In the network configuration shown in FIG. 4, when receiver 100 is end node Nh and no end node is first described in the branch candidate list, an end node with the shortest path is selected from among the receivers (103 to 105) as a branch.

Condition 3 (S405): When the end node selected in processing 3 (S404) has the internal end node, processing 4 (S406) is performed. When the end node selected in processing 3 (S404) does not have the internal end node, processing 5 (S407) is performed.

Processing 4 (S406): The end node selected in processing 3 (S403) is described in the branch candidate list. The end node selected in processing 3 (S403) and the internal end node of the selected end node are deleted from the calculation target list. For example, when receiver 103 is selected as a branch in processing 3, receiver 103 and receivers (104, 105) as the internal end node of receiver 103 are deleted from the calculation target list.

Processing 5 (S407): The end node selected in processing 3 (S403) is described in the branch candidate list, and deleted from the calculation target list. For example, when receiver 106 is selected as a branch in processing 3, receiver 106 is deleted from the calculation target list.

In the process of calculating multicast distribution tree, when processing 4 (S406) or processing 5 (S407) is finished, processing flow returns to condition 2 (S403).

According to the method of calculating the multicast distribution tree described above, Nh calculates the multicast distribution tree.

(Step 3-3)

Processing procedures required to construct a multicast distribution tree will be described below. In the following processing procedures, Nk is assumed as an end node that is a sender that performs step 3-2.

First, Nk transmits a message (hereinafter, referred to as a "forwarding request message") aimed to construct the multicast distribution tree to each end node that is a branch in the multicast distribution tree using IP unicast. The forwarding request message describes an IP address to forward a packet for multicast communication with Nk as a source (hereinafter, described as a "forwarding rule"). In the end node receiving the forwarding request message, an IP multicast address that N1 always uses is described in the forwarding rule for the end node (N1) having the internal end node. In the network configuration shown in FIG. 4, when receiver 103 is a branch that receives the forwarding request message, since receivers (104, 105) exist as the internal end node of receiver 103, IP multicast address used by receiver 103 is described in the forwarding rule. When the receivers (104, 105) on the network that supports IP multicast designate a specific IP multicast address, the address is described. By this means, using receiver 103 as a branch, the distribution tree is constructed to distribute packets of sender 100 to farther receivers (104, 105) from receiver 103. FIG. 5 shows the forwarding rule in the multicast distribution tree constructed by the sender and another forwarding rule in the multicast distribution tree constructed by other end node. In the case of the multicast distribution tree constructed by the sender, an IP address of the sender end node is described as a root.

The end node receiving the forwarding request message transfers the packet for multicast communication with Nk as a source end node according to the forwarding rule.

In addition, the forwarding rule has an expire time, and Nk transmits the forwarding request message at regular intervals, and thereby maintains the multicast distribution tree. Further, an end node that is a branch in the multicast distribution tree discards the corresponding forwarding rule when not receiving the forwarding request message for a fixed period.

[Step 4]

In step 4, an end node that is a sender in multicast communication performs packet distribution to the end nodes that is receivers, according to the multicast distribution tree constructed in the processing procedures described in the step 3-3.

At this point, an end node that receives packets forwarded according to the multicast distribution tree cannot identify an IP address of an original source end node from an IP header. This is because in the network configuration shown in FIG. 4, receiver 103 receiving packets from sender 100 describes the IP address of 103 as an IP address of a source described in the packet header in performing IP multicast to receivers 104 and 105. Therefore, an end node that is a sender inserts its IP address in a payload of a packet to distribute so that an end node receiving the packet can identify an IP address of the original source end node.

Embodiments of the present invention will be explained below in detail with reference to the accompanying drawings.

EMBODIMENT 1

Figure 4:
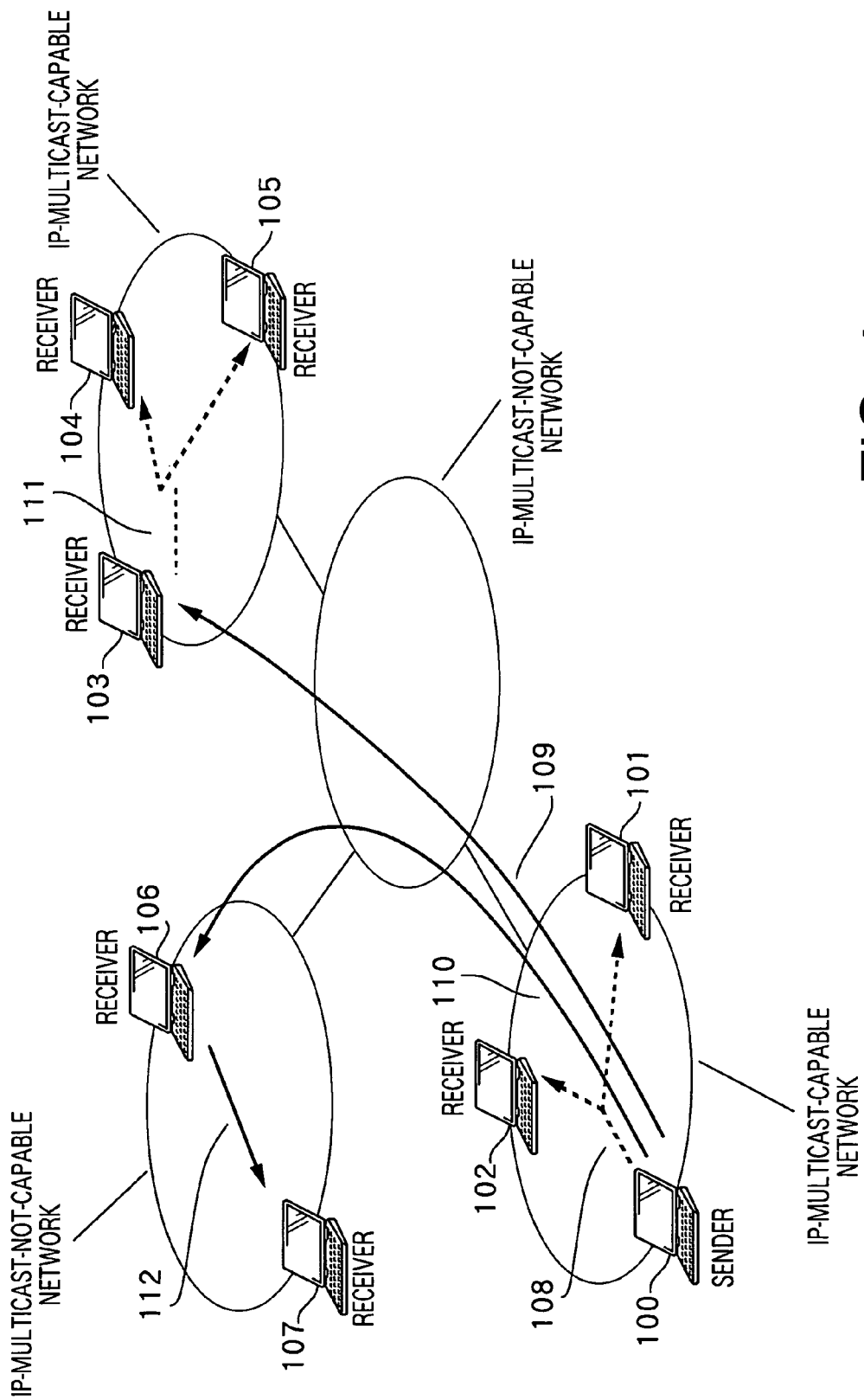
FIG. 4 is a schematic diagram of a network configuration to which is applied a packet distribution control method according to one Embodiment.

FIG. 4 is a schematic diagram of a network configuration to which is applied the packet distribution control method according to this Embodiment. In FIG. 4, it is assumed that an end node that is sender 100 performs packet distribution between a plurality of end nodes that are receivers (101 to 107). In addition, it is herein assumed that sender 100 and receivers (101 to 107) have finished calculation and construction of the multicast distribution tree with sender 100 as a root according to the processing described in steps 1 to 3, and that the receivers (101 to 107) forward packets according to the multicast distribution tree constructed by sender 100.

Sender 100 distributes packets to receivers (101, 102) that are the internal end nodes of sender 100 using IP multicast (108). Further, according to the multicast distribution tree, sender 100 distributes packets to each of receivers (103, 106) that is the external end node of sender 100 using IP unicast (109, 110). The receivers (101, 102) connected to the same network that supports IP multicast as sender 100 are joining a multicast group with sender 100 as a source according to the processing described in step 2, and receive IP multicast packets (108) transmitted from sender 100.

Receiver 103 receiving the packets distributed by IP unicast (109) exchanges an IP header of the received IP unicast packet with an IP multicast header with receiver 103 as a source and an IP multicast address used by receiver 103 as a destination, according to the multicast distribution tree, and distributes the packets to receivers (104, 105) that is the internal end node of receiver 103 using IP multicast (111). The receivers (104, 105) are joining a multicast group with receiver 103 as a source by the processing described in the step 2, and receive the IP multicast packets (111) transmitted from the receiver (103).

The receiver (106) receiving the packets distributed by IP unicast (110) distributes the packets to a receiver (107) that is the external end node of receiver 106 using IP unicast (112), according to the multicast distribution tree.

As described above, in this Embodiment, packet distribution is performed using IP multicast or IP unicast as appropriate according to end nodes that are receivers.

Figure 6:
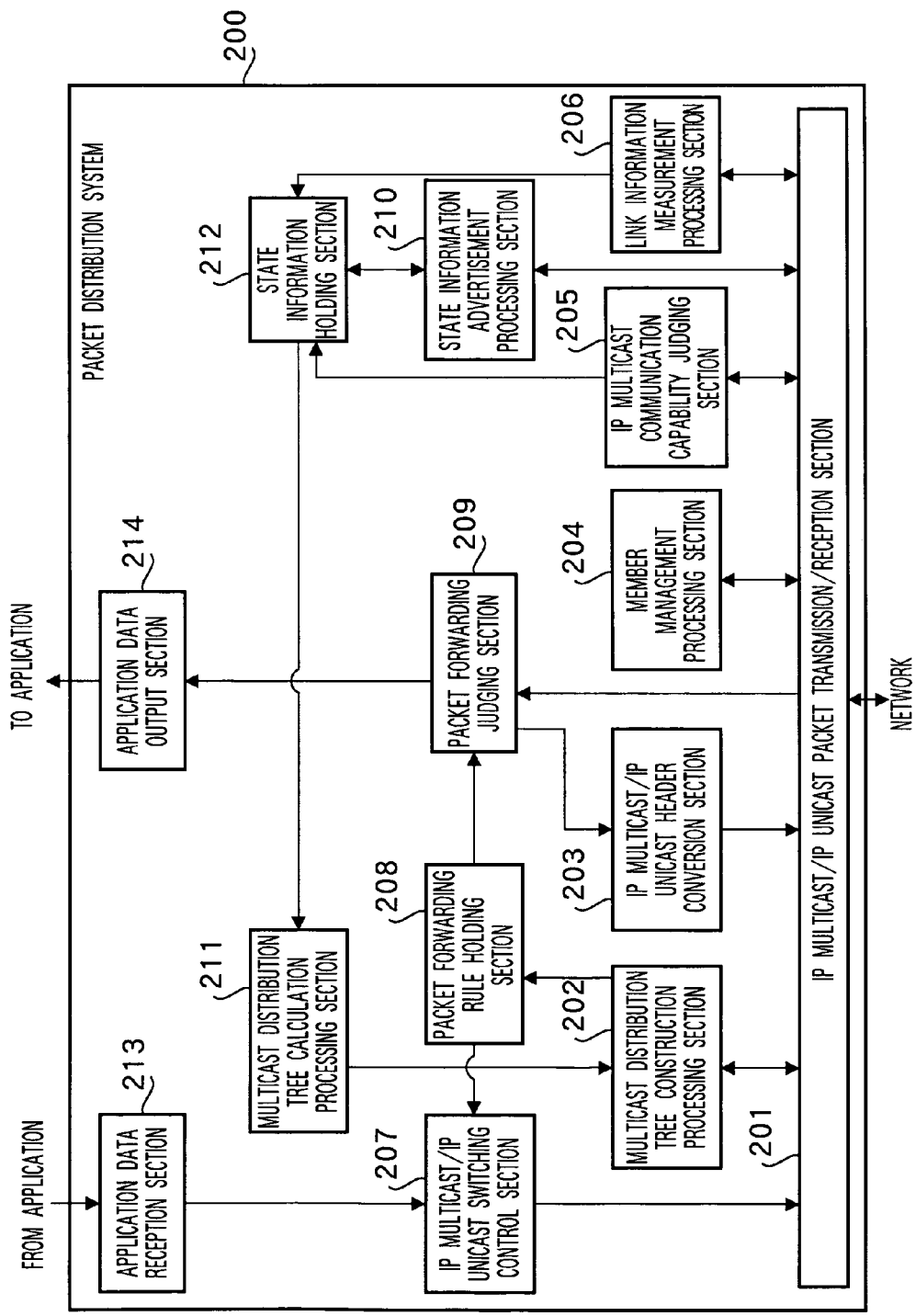
FIG. 6 is a block configuration diagram of end nodes in the above Embodiment.

FIG. 6 is a block configuration diagram of packet distribution system 200 on end nodes. Each end node having packet distribution system 200 obtains IP address information of other end nodes than itself by member management processing section 204 having the dispersed member management function described in the step 1, via IP multicast/IP unicast packet transmission/reception processing section 201.

In each end node, IP multicast communication capability judging section 205, which performs the processing described in step 2, judges whether other end nodes than itself are capable of communicating in IP multicast or communicating only in IP unicast, via IP multicast/IP unicast packet transmission/reception processing section 201.

Then, in each end node, link information measurement processing section 206 measures the number of hops, delay and usable bandwidth on a path to other end nodes via IP multicast/IP unicast packet transmission/reception processing section 201, according to the processing procedure described in the step 3-1. Further, each end node generates its state information described in the step 3-1 from the results obtained in the processing executed in IP multicast communication capability judging section 205 and link information measurement processing section 206, and stores the state information in state information holding section 212. Then, state information advertisement processing section 210 advertises its own state information stored in state information holding section 212 to the other end nodes as the state information advertising message described in the step 3, via IP multicast/IP unicast packet transmission/reception processing section 201. At the same time, state information advertisement processing section 210 receives state information advertising messages described in the step 3 from the other end nodes via IP multicast/IP unicast packet transmission/reception processing section 201, and stores the state information of the other end nodes in state information holding section 212.

In an end node that is a sender in multicast communication, multicast distribution tree calculation processing section 211 performs the processing of calculating a multicast distribution tree, using the internal state information of each end node stored in state information holding section 212 and a method for calculating multicast distribution tree described in the step 3-2 using the algorithm of calculating the multicast distribution tree described in the step 3.

Multicast distribution tree construction processing section 202 performs the processing of constructing the multicast distribution tree by the method of constructing a multicast distribution tree described in the step 3-3, according to the result obtained in the processing of calculating the multicast distribution tree. Multicast distribution tree construction processing section 202 transmits a forwarding request message described in the step 3-3 to each end node that is a branch of the multicast distribution tree calculated by the processing of calculating the multicast distribution tree, via IP multicast/IP unicast packet transmission/reception processing section 201, using IP unicast.

An end node receiving the forwarding request message stores the forwarding rule described in the step 3-3 contained in the forwarding request message in packet forwarding rule holding section 208 via multicast distribution tree construction processing section 202.

FIG. 5 shows contents stored in packet forwarding rule holding section 208. In the packet forwarding rule holding section 208, an IP multicast address or IP address of an end node that is a next forwarding destination of a packet in the multicast distribution tree constructed by itself, is described. Further in the packet forwarding rule holding section 208, an IP multicast address or IP address of an end node that is a next forwarding destination of a packet in the multicast distribution tree constructed by other end node by the processing of constructing the multicast distribution tree is described.

An end node that is a sender in multicast communication performs packet distribution according to the procedures described in the step 4, after completing the processing of constructing the multicast distribution tree. More specifically, in the packet distribution system 200, data input from application data reception section 213 is provided to IP multicast/IP unicast switching control section 207. According to the forwarding rule of the packet described in the packet forwarding rule holding section 208, the IP multicast/IP unicast switching control section 207 judges as appropriate whether to distribute the received application data using IP multicast, IP unicast or both IP multicast and IP unicast. Then, a packet is forwarded according to the distribution system according to the judgment result via IP multicast/IP unicast packet transmission/reception processing section 201. An extension header is attached to the transmitted packet, and the extension header describes an IP address of the end node that is a sender.

In an end node receiving the packet directly or via other end nodes distributed from the end node that is a sender, the packet is provided to packet forward judging section 209 via IP multicast/IP unicast packet transmission/reception processing section 201. Packet forward judging section 209 extracts the application data from the received packet, and provides the application data to application via application data output section 214. Packet forward judging section 209 refers to packet forwarding rule holding section 208 based on the IP address of the source end node described in the extension header of the received packet, and judges an IP multicast address or an IP address to next forward the received packet.

When there is a next forwarding destination, packet forward judging section 209 transmits the packet via IP multicast/IP unicast packet transmission/reception processing section 201 after the IP header is rewritten as appropriate in IP multicast/IP unicast header conversion section 203. When there is no next forwarding destination, the processing is finished without any operation.

In addition, member management processing section 204 has the function of monitoring end nodes, transmits the response request message to other end nodes using the multicast distribution tree, promptly detects unexpected leaving from multicast communication due to trouble of an end node, reconstructs the multicast distribution tree from the processing described in steps 3-2 and 3-3, and thereby it is possible to reduce the suspended time in multicast communication.

Further, member management processing section 204 has the authentication function, and with respect to a join request of a new end node or leave request in multicast communication described in the step 1, is capable of judging whether the end node making the request is authenticated to join or leave multicast communication or is misrepresented.

The extension header described in the step 4 is attached to, as well as a packet for multicast communication, messages aimed at control of between end nodes in the present invention (including a join request message, leave request message, join advertising message, leave advertising message, response request message, response message, measurement packet, measurement response packet, state information advertising message, advertisement reception acknowledge message, and forwarding request message).

IP multicast/IP unicast packet transmission/reception processing section 201 has the authentication function, and when transmitting a packet in communication with other end nodes performed via IP multicast/IP unicast packet transmission/reception processing section 201, is capable of embedding authentication information aimed at authenticating the end node having the function of packet distribution system 200 in the extension header described in the step 4.

Further, IP multicast/IP unicast packet transmission/reception processing section 201 has another authentication function, and when receiving a packet in communication with other end nodes performed via IP multicast/IP unicast packet transmission/reception processing section 201, is capable of judging whether or not the end node of the source of the packet is misrepresented from the authentication information to authenticate the end node of the source of the packet contained in the extension header attached to the packet.

Furthermore, IP multicast/IP unicast packet transmission/reception processing section 201 has the function of detecting congestion in multicast communication and another function of retransmitting data, and is capable of performing retransmission processing for a packet loss in exchange of massages aimed at packet distribution or control for multicast communication (including a join request message, leave request message, join advertising message, leave advertising message, response request message, response message, measurement packet, measurement response packet, state information advertising message, advertisement reception acknowledge message, and forwarding request message).

Figure 7:
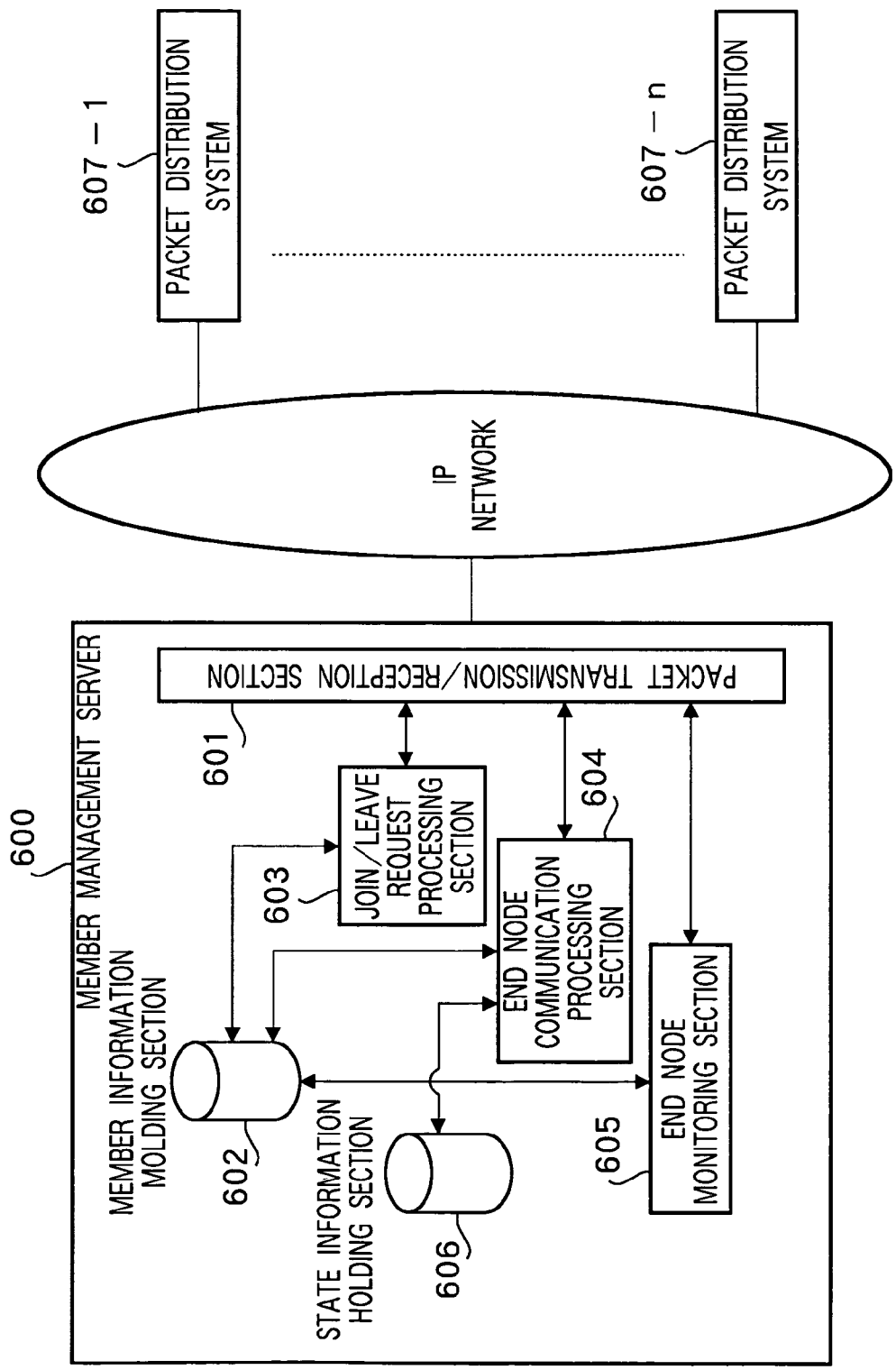
FIG. 7 is a block diagram of a member management server.

Moreover, in multicast communication, shown in FIG. 7, a configuration may be adopted that member management server 600 is provided that manages end nodes to join or leave the communication, the packet distribution systems (607-1 to 607-n) communicate with the member management server 600, and thereby the server recognizes the end nodes to join or leave the communication.

By this means, for joining and leaving of end nodes in multicast communication, it is possible to reduce amounts of exchange of the join advertising message and leave advertising message between end nodes, and reduce the processing load on the end nodes due to exchange of the messages.

In member management server 600, join/leave request processing section 603 receives a join request message or leave request message from an end node via packet transmission/reception section 601, stores the information in member information holding section 602 and manages the end node in multicast communication. Further, for group joining and leaving of an end node, in member management server 600, end node communication processing section 604 transmits a join advertising message or leave adverting message to other end nodes via packet transmission/reception section 601.

In member management server 600, end node monitoring section 605 is provided, monitors end nodes via packet transmission/reception section 601, and promptly detects unexpected leaving from multicast communication due to trouble of an end node, and advertises the leaving to other end nodes so that the other end nodes reconstruct the multicast distribution tree from the processing described in steps 3-2 and 3-3, and it is thereby possible to reduce the suspended time in multicast communication.

Further, in member management server 600, state information holding section 606 is provided, collects its own state information stored by the end node and advertises the information to other end nodes via end node communication processing 604, and it is thereby possible to reduce amounts of exchange of the state information advertising message and advertisement reception acknowledge message described in the step 3 between end nodes, and reduce the processing load on the end nodes due to exchange of the messages.

Furthermore, in member management server 600, join/leave request processing section 603 has the function of authenticating an end node, and for a join request of a new end node or leave request in multicast communication described in the step 1, is capable of judging whether the end node making the request is authenticated to join or leave multicast communication or is misrepresented.

Still furthermore, in member management server 600, packet transmission/reception section 601 has the authentication function, and when transmitting a packet in communication with other end nodes performed via packet transmission/reception section 601, is capable of embedding authentication information aimed at certificating that member management server 600 is authenticated in a packet as well as in the extension header described in the step 4.

Moreover, in member management server 600, packet transmission/reception section 601 has another authentication function, and when receiving a packet in communication with other end nodes performed via packet transmission/reception section 601, is capable of judging whether or not the end node of the source of the packet is misrepresented from the authentication information to authenticate the end node of the source of the packet contained in the extension header described in the step 4 added to the packet.

In addition, the present invention is applicable to multicast communication by IPv6 by using equivalent function to IGMP in MLD (Multicast Listener Discovery Protocol) for join/leave packets by IGMP.

A first aspect of the present invention is a packet distribution control method in multicast communication of one-to-many or many-to-many communication, for using both IP multicast and IP unicast for packet distribution in end nodes joining the multicast communication, and switching between IP multicast and IP unicast according to a receiver end node.

According to such a packet distribution control method, each end node uses IP unicast in packet distribution to other end nodes not capable of communicating only in IP multicast, thereby implementing multicast communication on a network that does not support IP multicast that is the issue of IP multicast, and reducing the processing load on end nodes and network resources to consume, compared to application layer multicast.

A second aspect of the present invention is a packet distribution control method that sets a forwarding rule for each end node joining multicast communication based on a multicast distribution tree, describes an IP multicast address in the forwarding rule when a next packet distribution destination is capable of communicating in IP multicast or describes an IP address of an end node of the next packet distribution destination in the forwarding rule when the next packet distribution destination is not capable of communicating in IP multicast, and each end node switches between IP multicast and IP unicast according to an address attribute described in the forwarding rule.

According to such a packet distribution control method, a forwarding rule is set for each end node, in the forwarding rule an IP multicast address is described when a next packet distribution destination is capable of communicating in IP multicast or an IP address of an end node of a next packet distribution destination is described when the next distribution is not capable of communicating in IP multicast. Thereby, by changing a destination address of the packet according to the forwarding rule, each end node is capable of switching between IP multicast and IP unicast according to a receiver end node.

A third aspect of the present invention is a packet distribution control method that sets a forwarding rule based on a multicast distribution tree for end nodes joining multicast communication, describes an IP multicast address in the forwarding rule when a next packet distribution destination is capable of communicating in IP multicast or describes an IP address of an end node of a next packet distribution destination in the forwarding rule when the next distribution is not capable of communicating in IP multicast, and when other end node capable of communicating in IP multicast is present among end nodes that are roots or branches of the multicast distribution tree, packet distribution is performed on the other end node using an IP multicast packet with the IP multicast address as a destination address, while when other end node not capable of communicating in IP multicast is present among end nodes that are roots or branches of the multicast distribution tree, packet distribution is performed on the other end node using an IP unicast packet with the IP address of the other end node as a destination address.

According to such a packet distribution control method, end nodes capable of switching between IP multicast and IP unicast according to an address attribute described in the forwarding rule are implemented.

A fourth aspect of the present invention is an IP multicast capability judging method that an end node joining multicast communication transmits a response request message in IP multicast to other end nodes unknown on whether or not IP multicast is possible or to end nodes other than itself, and judges an end node returning a response message in response to the response request message as an end node capable of communicating in IP multicast.

According to such an IP multicast capability judging method, an end node joining multicast communication is capable of judging whether or not communication in IP multicast is possible with other end nodes, and using the result to set a forwarding rule.

A fifth aspect of the present invention is a multicast distribution tree calculation method that a sender end node among end nodes joining multicast communication obtains a multicast distribution tree with the sender end node as a root, where the sender end node registers end nodes targeted for the multicast distribution tree in a list, eliminates an internal end node with which the sender end node is capable of communicating in IP multicast from the list of registration, specifies an end node that is a branch based on a distribution tree calculation algorithm from the list of registration, eliminates the branch end node and an internal end node of the branch end node from the list of registration, repeats the same processing on ahead portions from the branch end node as a starting point, and thereby obtains the multicast distribution tree.

According to such a multicast distribution tree calculation method, even in environment where both networks that support IP multicast and that do not support IP multicast exist, it is possible to calculate a multicast distribution tree that can judge whether to use IP multicast or IP unicast as packet distribution means.

A sixth aspect of the present invention is a multicast distribution tree construction method that a forwarding request message is transmitted in IP unicast to each branch end node of the multicast distribution tree calculated based on the multicast distribution tree calculation method of the fifth aspect, the forwarding request message describing a forwarding rule that is determined for each branch, the forwarding rule describing an IP address to forward a packet when receiving the packet for multicast communication with an end node that is a root of the multicast distribution tree as a source, and the branch end node receiving the forwarding request message holds the forwarding rule in the forwarding request message as a forwarding rule of the branch end node.

According to such a multicast distribution tree construction method, in environment where both networks that support IP multicast and that do not support IP multicast exist, it is possible to construct a multicast distribution tree via end nodes on the networks.

A seventh aspect of the present invention in the multicast distribution tree construction method according to the fifth aspect, is in the case of detecting an end node leaving multicast communication, reconstructing the multicast distribution tree according to a state after the end node leaves.

The multicast distribution tree is thereby reconstructed after an end node leaves multicast communication, and it is thus possible to implement multicast communication.

An eighth aspect of the present invention is providing a management server that manages end nodes joining multicast communication in the packet distribution control method of the first or second aspect, and information of the end nodes and information of join and leave of the end nodes are exchanged between the management server and the end nodes.

A ninth aspect of the present invention is a communication terminal which joins multicast communication that is one-to-many or many-to-many communication, uses IP multicast and IP unicast in packet distribution, and switches between IP multicast and IP unicast according to a receiver end node.

A tenth aspect of the present invention is that the communication terminal of the ninth aspect exchanges information of other end nodes and information of join and leave of the other end nodes with a management server that manages end nodes joining multicast communication.

An eleventh aspect of the present invention is a communication terminal which is an end node that is a sender among end nodes joining multicast communication, registers end nodes targeted for a multicast distribution tree in a list, eliminates an internal end node with which the sender is capable of communicating in IP multicast from the list of registration, specifies an end node that is a branch based on a distribution tree calculation algorithm from the list of registration, eliminates the branch end node and an internal end node of the branch end node from the list of registration, repeats the same processing on ahead portions from the branch end node as a starting point, and thereby obtains the multicast distribution tree.

The present application is based on Japanese Patent Applications No. 2003-361524 filed on Oct. 22, 2003, and No. 2004-300604 filed on Oct. 14, 2004, entire contents of which are expressly incorporated by reference herein.

INDUSTRIAL APPLICABILITY

The present invention enables implementation of multicast communication without increased processing load on end nodes and consuming network resources in environment where both networks that support IP multicast and that do not support IP multicast exist, and is applicable to one-to-many or many-to-many packet distribution and the like.

The invention claimed is:

1. A packet distribution control method in a multicast communication of one-to-many or many-to-many communication, said packet distribution control method comprising:
  checking, by an end node, as a sender end node that is capable of using both IP multicast and IP unicast and that joins the multicast communication, whether or not an end node as a receiver end node of a next packet distribution destination is capable of communicating in IP multicast;
  switching, by the sender end node, packet distribution to the receiver end node between IP multicast and IP unicast according to a result of the checking; and
  calculating a multicast distribution tree, in which a sender end node, among end nodes joining multicast communication obtains a multicast distribution tree with the sender end node as a root,
  wherein in the calculating, the sender end node registers end nodes targeted for the multicast distribution tree in a registration list, eliminates an internal end node with which the sender end node is capable of communicating in IP multicast from the registration list, specifies an end node that is a branch based on a distribution tree calculation algorithm from the registration list with the sender end node as a starting point, eliminates the branch end node and an internal end node of the branch end node from the registration list, adds the branch end node to the starting point, repeats the same processing on ahead portions from the branch end node, and thereby obtains the multicast distribution tree.

2. The packet distribution control method according to claim 1, further comprising:
  setting a forwarding rule in which an end mode joining multicast communication sets a forwarding rule for each end node joining multicast communication based on the multicast distribution tree, describing an IP multicast address attribute in the forwarding rule when a next packet distribution destination is capable of communicating in IP multicast or describing an IP address attribute of an end node of the next packet distribution destination in the forwarding rule when the next packet distribution destination is not capable of communicating in IP multicast, wherein the sender end node checks an address attribute described in the forwarding rule and switches between IP multicast and IP unicast.

3. The packet distribution control method according to claim 2, wherein when an end node capable of communication in IP multicast is present among end nodes that are roots or branches of the multicast distribution tree, performing packet distribution on the end node capable of communication using an IP multicast packet with the IP multicast address as a destination address, while when an end node incapable of communication in IP multicast is present among end nodes that are roots or branches of the multicast distribution tree, performing packet distribution on the end node incapable of communicating using an IP unicast packet with the IP address of the end node incapable of communication as a destination address.

4. The packet distribution control method according to claim 1, further comprising:

transmitting, by an end node joining multicast communication, a response request message in IP multicast to end nodes than its own end node, with respect to which it is unclear whether or not IP multicast communication is possible, and determining an end node returning a message in response to the response request message as an end node capable of communication in IP multicast.

5. The packet distribution control method according to claim 1, wherein a forwarding request message is transmitted in IP unicast to each branch end node of the calculated multicast distribution tree based upon the calculating, the forwarding request message describing a forwarding rule that is determined for each branch, the forwarding rule describing an IP address to forward a packet when receiving the packet for multicast communication with an end node that is a root of the multicast distribution tree as a source, and the branch end node receiving the forwarding request message considers the forwarding rule in the forwarding request message as a forwarding rule of the branch end node.

6. The packet distribution control method according to claim 5, wherein, when an end node leaving multicast communication is detected, the multicast distribution tree is reconstructed according to a state after the end node leaves.

7. The packet distribution control method according to claim 1, wherein information regarding end nodes and information regarding joining and leaving of the end nodes are exchanged between a management server that manages end nodes joining multicast communication and the end nodes, and the management server manages the end nodes.

8. A communication terminal which joins a multicast communication that is a one-to-many or is a many-to-many communication, the communication terminal comprising:

an IP multicaster that uses an IP multicast address in packet distribution;

an IP unicaster that uses an IP address in packet distribution; and switcher that switches between IP multicast and IP unicast according to a receiver end node;

wherein, when joining a multicast communication as a sender end node, the communication terminal checks whether or not an end node, as a receiver end node, of a next packet distribution destination is capable of communicating in IP multicast, switches packet distribution to the receiver end node between IP multicast and IP unicast according to a result of the check, and obtains a multicast distribution tree with the sender end node as a root by registering end nodes targeted for the multicast distribution tree in a registration list, eliminates an internal end mode with which the sender end node is capable of communicating in IP multicast from the registration list, specifies an end node that is a branch based on a distribution tree calculation algorithm from the registration list with the sender end node as a starting point, eliminates the branch end node and an internal end node of the branch end node from the registration list, adds the branch end node to the starting point, and repeats the same processing on ahead portions from the branch end node.

9. The communication terminal according to claim 8, wherein the communication terminal exchanges information regarding other end nodes and information of regarding joining and leaving of the other end nodes with a management server that manages end nodes joining the multicast communication.

10. The communication terminal according to claim 8, wherein the communication terminal calculates a multicast distribution tree where IP multicast and IP unicast are both present to use both IP multicast and IP unicast for packet distribution.

* * * * *